(12) United States Patent
Ozdemir et al.

(10) Patent No.: US 8,699,297 B2
(45) Date of Patent: Apr. 15, 2014

(54) DEGHOSTING AND RECONSTRUCTING A SEISMIC WAVEFIELD

(75) Inventors: Ahmet Kemal Ozdemir, Asker (NO); Ali Ozbek, Milton (GB); Massimiliano Vassallo, Brighton (GB); Dirk-Jan Van Manen, Reigate (GB)

(73) Assignee: WesternGeco L.L.C., Houston, TX (US)

( * ) Notice: Subject to any disclaimer, the term of this patent is extended or adjusted under 35 U.S.C. 154(b) by 1055 days.

(21) Appl. No.: 12/370,735

(22) Filed: Feb. 13, 2009

(65) Prior Publication Data

US 2010/0211321 A1 Aug. 19, 2010

(51) Int. Cl.
*G01V 1/28* (2006.01)

(52) U.S. Cl.
USPC .......................................................... 367/24

(58) Field of Classification Search
USPC .......................................................... 367/24
See application file for complete search history.

(56) References Cited

U.S. PATENT DOCUMENTS

| | | | |
|---|---|---|---|
| 4,397,004 A * | 8/1983 | Bronislaw | 367/27 |
| 4,594,693 A | 6/1986 | Pann et al. | |
| 4,616,320 A | 10/1986 | Kerr et al. | |
| 4,922,465 A | 5/1990 | Pieprzak et al. | |
| 5,172,345 A | 12/1992 | van der Poel | |
| 5,550,786 A | 8/1996 | Allen | |
| 5,848,379 A | 12/1998 | Bishop | |
| 6,021,379 A | 2/2000 | Duren et al. | |
| 6,512,980 B1 | 1/2003 | Barr | |
| 6,556,009 B2 | 4/2003 | Kellman et al. | |
| 6,625,213 B2 | 9/2003 | Bottreau et al. | |
| 6,775,618 B1 | 8/2004 | Robertsson et al. | |
| 6,801,473 B2 | 10/2004 | Matteucci et al. | |
| 6,834,236 B2 | 12/2004 | Iranpour | |
| 6,876,927 B1 | 4/2005 | Chatelain et al. | |
| 6,894,948 B2 * | 5/2005 | Brittan et al. | 367/24 |
| 7,286,690 B2 * | 10/2007 | Kelly | 382/109 |
| 7,639,564 B2 * | 12/2009 | Paffenholz et al. | 367/38 |
| 7,676,327 B2 * | 3/2010 | Ozdemir et al. | 702/17 |
| 7,715,988 B2 | 5/2010 | Robertsson et al. | |
| 7,817,495 B2 | 10/2010 | Ozbek et al. | |
| 7,957,906 B2 * | 6/2011 | Turnbull | 702/17 |
| 8,116,166 B2 | 2/2012 | Robertsson et al. | |
| 2003/0105592 A1 * | 6/2003 | Fokkema et al. | 702/17 |

(Continued)

FOREIGN PATENT DOCUMENTS

| | | |
|---|---|---|
| GB | 2450122 | 12/2008 |
| WO | 2005121837 | 12/2005 |
| WO | 2008005798 | 1/2008 |

OTHER PUBLICATIONS

Lang, "Kriging Interpolation", Apr. 24, 2001. obtained from http://www.nbb.cornell.edu/neurobio/land/oldstudentprojects/cs490-94to95/clang/kriging.html.*

(Continued)

*Primary Examiner* — Eric Bolda

(57) ABSTRACT

A technique includes receiving data, which are indicative of measurements acquired by seismic sensors of a seismic wavefield. The seismic wavefield is formed from a combination of an upgoing wavefield and a downgoing wavefield. The technique includes providing a statistical estimator, which relates the upgoing wavefield to a linear combination of the measurements and a reconstruction error. The technique includes determining the upgoing wavefield based on the statistical estimator. The determination includes substantially minimizing a variance of the reconstruction error.

28 Claims, 5 Drawing Sheets

(56) References Cited

U.S. PATENT DOCUMENTS

| | | | |
|---|---|---|---|
| 2004/0145968 A1* | 7/2004 | Brittan et al. | 367/15 |
| 2004/0189277 A1 | 9/2004 | Michel | |
| 2005/0013194 A1 | 1/2005 | Vaage et al. | |
| 2005/0111702 A1* | 5/2005 | Kelly | 382/109 |
| 2005/0195686 A1 | 9/2005 | Vaage et al. | |
| 2005/0267695 A1 | 12/2005 | German | |
| 2008/0089174 A1 | 4/2008 | Sollner et al. | |
| 2008/0275649 A1 | 11/2008 | Ozdemir et al. | |
| 2008/0279043 A1 | 11/2008 | Soubaras | |
| 2008/0312878 A1 | 12/2008 | Robertsson et al. | |
| 2009/0022009 A1 | 1/2009 | Ozdemir et al. | |
| 2009/0067285 A1* | 3/2009 | Robertsson et al. | 367/24 |
| 2009/0122641 A1 | 5/2009 | Hillesund et al. | |
| 2009/0281732 A1* | 11/2009 | Turnbull | 702/17 |
| 2009/0292475 A1 | 11/2009 | Alam et al. | |
| 2009/0296523 A1 | 12/2009 | Ozbek et al. | |
| 2010/0002541 A1 | 1/2010 | Ozdemir et al. | |
| 2010/0030479 A1 | 2/2010 | Higginbotham et al. | |
| 2010/0097888 A1 | 4/2010 | Neelamani et al. | |
| 2010/0182873 A1 | 7/2010 | Kluver | |
| 2010/0211320 A1 | 8/2010 | Vassallo et al. | |
| 2010/0211322 A1 | 8/2010 | Vassallo et al. | |
| 2010/0211323 A1 | 8/2010 | Ozdemir et al. | |
| 2010/0299069 A1 | 11/2010 | Moore | |
| 2010/0329077 A1 | 12/2010 | Ozbek et al. | |
| 2011/0211319 A1 | 9/2011 | Kosowsky et al. | |

OTHER PUBLICATIONS

PCT International Search Report, Sep. 29, 2010, for PCT/US2010/023814.

Bolondi, et al., Offset Continuation of Seismic Sections, Geophysical Prospecting, 1982, pp. 813-828, vol. 30.

Brown, Multi-Channel Sampling of Low-Pass Signals, IEEE Transactions on Circuits and Systems, Feb. 1981, pp. 101-106, vol. CAS-28, No. 2.

Linden, A Discussion of Sampling Theorems, Proceedings of the IRE, 1959, pp. 1219-1226.

Mallat, Matching Pursuits with Time-Frequency Dictionaries, IEEE Transactions on Circuits and Systems, Dec. 1993, pp. 3397-3415, vol. 41, No. 12.

Ozdemir, et al., Interpolation of Irregularly Sampled Data by Matching Pursuit, 70th EAGE Conference, Jun. 2008.

Papoulis, Generalized Sampling Expansion, IEEE Transactions on Circuits and Systems, Nov. 1977, vol. CAS-24, No. 11.

International Search Report of PCT Application No. PCT/US2010/023694 dated Nov. 30, 2010: pp. 1-4.

International Search Report of PCT Application No. PCT/US2010/023696 dated Nov. 29, 2010: pp. 1-4.

International Search Report of PCT Application No. PCT/US2010/023815 dated Nov. 30, 2010: pp. 1-4.

Admundsen et al., "Rough-sea deghosting of streamer seismic data using pressure gradient approximations," Geophysics, Jan.-Feb. 2005, vol. 70(1): pp. V1-V9.

Eldar et al., "Filterbank Reconstruction of Bandlimited Signals from Nonuniform and Generalized Samples," IEEE Transactions on Signal Processing, Oct. 2000, vol. 48(10): pp. 2864-2875.

Robertsson et al., "On the use of multicomponent streamer recordings for reconstruction of pressure wavefields in the crossline direction," Geophysics, Sep.-Oct. 2008, vol. 73(5): pp. A45-A49.

Extended European Search Report of European Application No. 10741640.6 dated Oct. 17, 2013: pp. 1-6.

Amundsen, "Wavenumber-based filtering of marine point-source data," Geophysics, Sep. 1993, vol. 58(9): pp. 1335-1348.

Extended European Search Report of European Application No. 10741687.7 dated Oct. 16, 2013: pp. 1-6.

* cited by examiner

DEGHOSTING AND RECONSTRUCTING A SEISMIC WAVEFIELD

BACKGROUND

The invention generally relates to deghosting and reconstructing a seismic wavefield.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving data, which are indicative of measurements acquired by seismic sensors of a seismic wavefield. The seismic wave field is formed from a combination of an up going wavefield and a downgoing wave field. The technique includes providing a statistical estimator, which relates the upgoing wavefield to a linear combination of the measurements and a reconstruction error. The technique includes determining the upgoing wavefield based on the statistical estimator. The determination includes substantially minimizing a variance of the reconstruction error.

In another embodiment of the invention, a system includes an interface and a processor. The interface receives data, which are indicative of measurements acquired by seismic sensors of a seismic wavefield. The seismic wavefield is formed from a combination of an upgoing wavefield and a downgoing wavefield. The processor processes the data to provide a statistical estimator relating the upgoing wavefield to a linear combination of the measurements and a reconstruction error and determine the upgoing wavefield based on the statistical error. The determination includes substantially minimizing a variance of the reconstruction error.

Advantages and other features of the invention will become apparent from the following drawing, description and claims.

DETAILED DESCRIPTION

Figure 1:
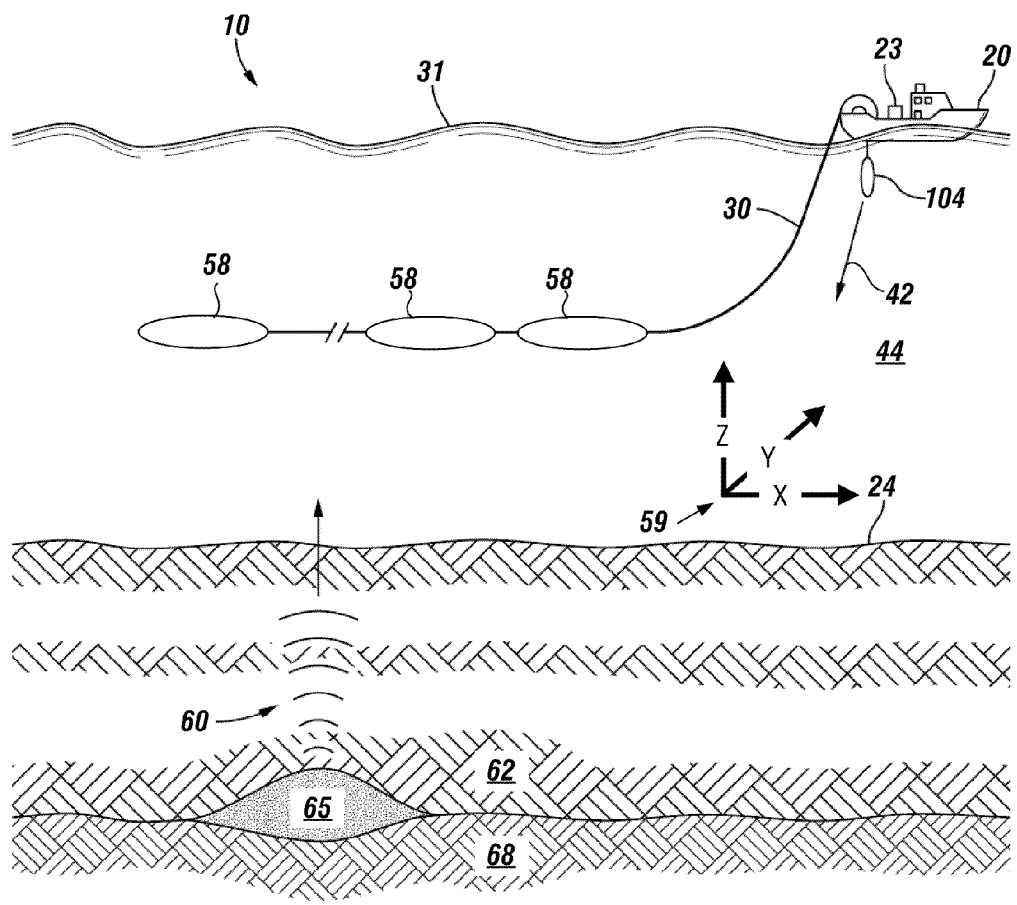
FIG. 1 is a schematic diagram of a marine-based seismic data acquisition system according to an embodiment of the invention.

FIG. 1 depicts an embodiment 10 of a marine seismic data acquisition system in accordance with some embodiments of the invention. In the system 10, a survey vessel 20 tows a spread of one or more seismic streamers 30 (one exemplary streamer 30 being depicted in FIG. 1) behind the vessel 20. As a non-limiting example, the seismic spread may be formed from streamers 30 that are towed at different depths (such as an over/under spread, for example), in accordance with some embodiments of the invention. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the invention, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

For embodiments of the invention in which the streamer spread contains streamers that are towed at different depths, the sensors of the spread may be particle motion and pressure sensors, which acquire particle motion and pressure measurements at different depths.

The marine seismic data acquisition system 10 includes at least one seismic source 104 that may be formed from one or more seismic source elements, such as air guns, for example, which are connected to the survey vessel 20. Alternatively, in other embodiments of the invention, the seismic source(s) 104 may operate independently of the survey vessel 20, in that the seismic source(s) 104 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the seismic source(s) 40 produce corresponding reflected acoustic signals, or pressure waves 60, which are sensed by the seismic sensors 58. It is noted that the pressure waves that are received and sensed by the seismic sensors 58 include "upgoing" pressure waves that propagate to the sensors 58 without reflection, as well as "downgoing" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23.

The process of decomposing a recorded wavefield into its upgoing and downgoing components is often referred to as wavefield separation, or "deghosting." The deghosting relies on particle motion measurements, such as measurements by particle velocity sensors, such that the pressure and particle motion measurements may be combined to obtain "ghost free" data, or the upgoing seismic wavefield (the upgoing pressure wavefield, for example).

In accordance with embodiments of the invention described herein, techniques are set forth that provide for the concurrent, or joint, interpolation and deghosting of acquired seismic data. In other words, seismic data acquired by the pressure and particle motion sensors of the seismic streamer spread are processed for purposes of determining the upgoing seismic wavefield (an upgoing pressure wavefield, for example) at positions other than the streamer locations. These techniques are referred to herein as optimal multichannel deghosting and reconstruction (called "ODR") techniques.

It is noted that the pressure and particle motion sensors may be arranged, in generally, in a grid and thus, may acquire substantially uniformly spaced measurements. However, the techniques that are described herein may likewise be applied to irregularly, or non-uniformly-spaced, measurements. Thus, many variations are contemplated and are within the scope of the appended claims.

In general, the ODR technique may have one or more of the following advantages. The ODR technique is non-iterative; may be implemented in both the time-space and frequency-space domains; provides optimal estimates of the interpolated and deghosted data in a least squares sense; is data independent; is linear; depends only on the geometry of the acquisition; assumes a finite number of measurements and may be acquired on regular or irregular grids. Other and different characteristics and advantages of the ODR technique are contemplated, in accordance with other embodiments of the invention.

In the following examples, the ODR technique is described in connection with the frequency-space-space (f-x-y) domain. However, it is noted that in accordance with other embodiments of the invention, the ODR technique may be implemented in the time-space-space (t-x-y), the frequency-wavenumber-wavenumber (f-$k_x$-$k_y$) or the frequency-space-wavenumber domains. For notational brevity, the frequency dependence of the wavefields and the ghost operators is omitted in the following discussion.

In the following exemplary ODR technique, it is assumed that the samples of the pressure data and the vertical component of the particle motion data have been acquired at inline positions $x_m$ and irregular streamer positions $y_n$; and the problem is the estimation of the upgoing wavefield (called "$p_u$(x, y)" herein) at any desired position ($x_d$, $y_d$). The ODR technique is formulated as a statistical estimation problem in which the upgoing wavefield $p_u(x_d, y_d)$ is estimated by applying a linear estimator, as set forth below:

$$p_u(x_d, y_d) = \sum_{m=1}^{M}\sum_{n=1}^{N} \alpha_{mn}^* p(x_m, y_n) + \quad \text{Eq. 1}$$

$$\sum_{m=1}^{M}\sum_{n=1}^{N} \beta_{mn}^* v_z(x_m, y_n) + \sum_{m=1}^{M}\sum_{n=1}^{N} \chi_{mn}^* v_y(x_m, y_n) + w(x_d, y_d),$$

where "p($x_m$, $y_m$)" represents the acquired measurements of the total pressure wavefield (i.e., the measurements of the combined upgoing and downgoing wavefields); "$v_z$($x_m$, $y_m$)" represents the vertical component of the particle motion data (here, the particle velocity data) acquired at nonuniformly-spaced streamer positions; "w($x_d$, $y_d$)" represents the reconstruction error; "$\alpha_{mn}$," "$\beta_{mn}$," and "$\chi_{mn}$" represents the interpolator coefficients determined as described below; "*" represents the conjugation operation; and "M" represents the number of streamers.

In matrix notation, Eq. 1 may be expressed as follows:

$$p_u(x_d, y_d) = A^H P + B^H V_z + C^H V_y + w(x_d, y_d), \quad \text{Eq. 2}$$

where "A", "B", "C", "P", "$V_z$" and "$V_y$" represent MN-by-one dimensional vectors with the (mN+n)-th entries given by $\alpha_{mn}$, $\beta_{mn}$, $\chi_{mn}$, p($x_m$, $y_n$), $v_z$($x_m$, $y_n$), and $v_y$($x_m$, $y_n$), respectively.

In the spatial domain, the total pressure and particle motion wavefields may be expressed as follows:

$$p(x, y) = g_p(x, y) * p_u(x, y) + n_p(x, y), \quad \text{Eq. 3}$$

$$v_z(x, y) = g_z(x, y) * p_u(x, y) + n_z(x, y), \text{ and} \quad \text{Eq. 4}$$

$$v_y(x, y) = g_y(x, y) * p_u(x, y) + n_y(x, y), \quad \text{Eq. 5}$$

where "*" represents the convolution operator; "$g_p$(x, y)" represents the vertical particle motion ghosting operator; "$g_z$ "(x, y)" represents the vertical ghosting operator; "$g_y(x, y)$" represents the crossline ghosting operator; "$n_p(x, y)$" represents the pressure measurement noise; "$n_z(x, y)$" represents the vertical particle motion noise; "$n_y(x, y)$" represents the crossline particle motion measurement noise; and "$p_u(x, y)$" represents the upgoing pressure wavefield component. These measurements are obtained at a streamer depth called "$z_s$."

The frequency-wavenumber domain expressions for the ghosting operators may be described as follows:

$$G_p(k_x, k_y; z_s) = 1 - e^{-j4\pi k_z z_s}, \quad \text{Eq. 6}$$

$$G_z(k_x, k_y; z_s) = \frac{ck_z}{f}(1 + e^{-j4\pi k_z z_s}), \text{ and} \quad \text{Eq. 7}$$

$$G_y(k_x, k_y; z_s) = \frac{ck_y}{f}(1 - e^{-j4\pi k_z z_s}), \quad \text{Eq. 8}$$

where "$k_z$," the vertical wavenumber, is a function of the inline wavenumber "$k_x$," the crossline wavenumber "$k_y$," the acoustic speed "c" of sound in water; and the frequency "f," as set forth below:

$$k_z = \pm \frac{f}{c}\sqrt{1 - \frac{c^2}{f^2}(k_x^2 + k_y^2)}. \quad \text{Eq. 9}$$

According to the convention used herein, the sign of the vertical wavenumber $k_z$ is positive for wavefields traveling in the direction of the sea floor to the sea surface. Otherwise, the sign of the vertical wavenumber $k_z$ is negative.

In the least-squares-sense, the statistically optimal estimate of the upgoing pressure wavefield $p_u(x, y)$ may be obtained by minimizing the variance of the reconstruction error $w(x_d, y_d)$, as set forth below:

$$(\alpha_{mn}, \beta_{mn}, \chi_{mn}) = \quad \text{Eq. 10}$$
$$\arg\min_{\alpha_{mn}, \beta_{mn}, \chi_{mn}} E\left[|p_u(x_d, y_d) - (A^H P + B^H V_z + C^H V_y)|^2\right],$$

where "E[ ]" represents the statistical expectation operation.

Figure 2:
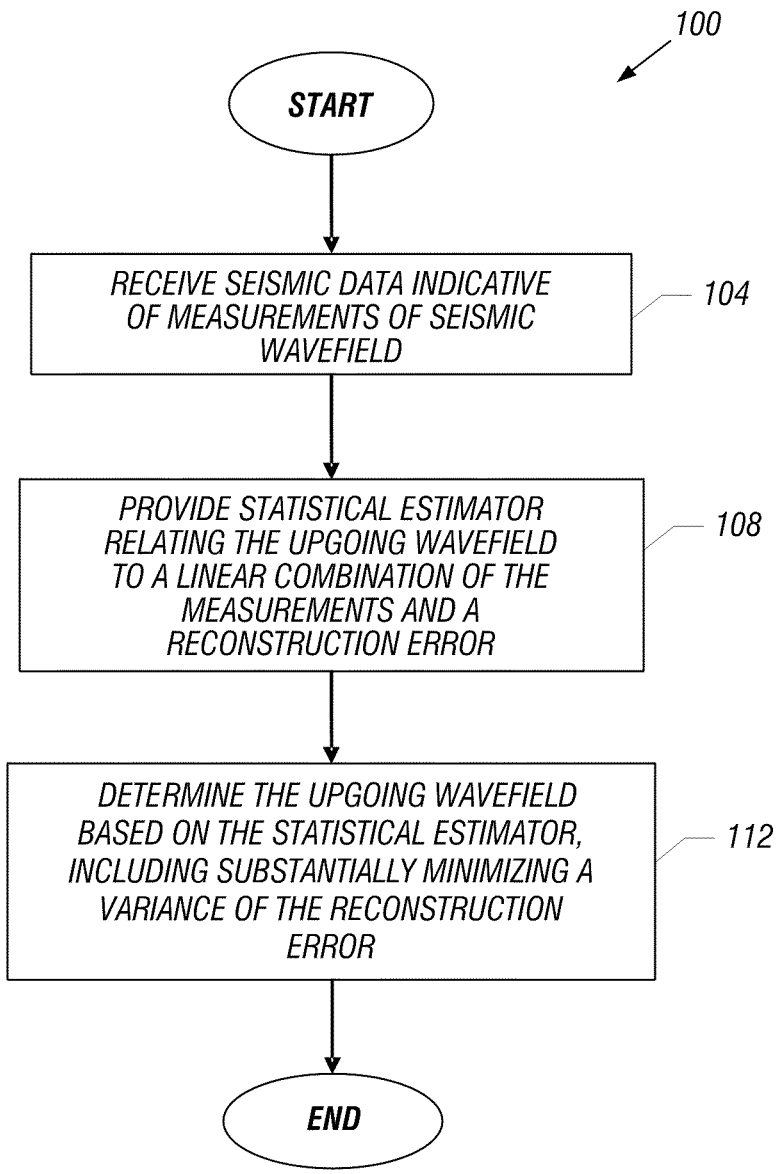
FIG. 2 is a flow diagram depicting a technique to jointly interpolate and deghost seismic data according to an embodiment of the invention.

Referring to FIG. 2, to summarize, a technique 100 that is depicted in FIG. 2 may generally be used to determine an upgoing wavefield, such as the upgoing pressure wavefield, based on pressure and particle motion measurements, in accordance with embodiments of the invention. Pursuant to the technique 100, seismic data are received (block 104), which are indicative of measurements acquired by seismic sensors of a seismic wavefield. The seismic wave field is formed from a combination of an up going wavefield and a downgoing wave field. According to the technique 100, a statistical estimator is provided (block 108), which relates the upgoing wavefield to a linear combination of the measurements and a reconstruction error. Based on the statistical estimator, the upgoing wavefield is determined (block 112), a determination that involves substantially minimizing the variance of the reconstruction error.

In accordance with embodiments of the invention, a minimizer of the cost function set forth in Eq. 10 is called the linear-minimum-mean-squares-error estimator and is the solution to the following set of normal equations:

$$\begin{bmatrix} R_{pp} & R_{pz} & R_{py} \\ R_{pz}^H & R_{zz} & R_{zy} \\ R_{py}^H & R_{zy}^H & R_{yy} \end{bmatrix} \begin{bmatrix} A \\ B \\ C \end{bmatrix} = \begin{bmatrix} R_{pu} \\ R_{zu} \\ R_{yu} \end{bmatrix}. \quad \text{Eq. 11}$$

In Eq. 11, the MN dimensional matrices $R_{pp}$, $R_{zz}$, $R_{yy}$, $R_{pz}$, $R_{py}$ and $R_{zy}$ are correlations between the pressure and particle motion measurements, as set forth below:

$$R_{pp} = E(PP^H), \quad \text{Eq. 12}$$

$$R_{zz} = E(V_z V_z^H), \quad \text{Eq. 13}$$

$$R_{yy} = E(V_y V_y^H), \quad \text{Eq. 14}$$

$$R_{pz} = E(PV_z^H), \quad \text{Eq. 15}$$

$$R_{py} = E(PV_y^H), \text{ and} \quad \text{Eq. 16}$$

$$R_{zy} = E(V_z V_y^H). \quad \text{Eq. 17}$$

Additionally, in Eq. 11, the MN-by-one vectors $R_{pu}$, $R_{zu}$ and $R_{yu}$ are correlations between pressure and particle motion measurements and the upgoing wavefield $p_u(x_d, y_d)$, as set forth below:

$$R_{pu} = E(Pp_u^*), \quad \text{Eq. 18}$$

$$R_{zu} = E(V_z p_u^*), \text{ and} \quad \text{Eq. 19}$$

$$R_{yu} = E(V_y p_u^*). \quad \text{Eq. 20}$$

The above-described correlation matrices (Eqs. 12, 13, 14, 15, 16 and 17) and vectors (Eqs. 18, 19 and 20) may be computed from the wavenumber spectrum of the upgoing wavefield, the ghost operators and the statistics of the measurement noise.

Figure 3:
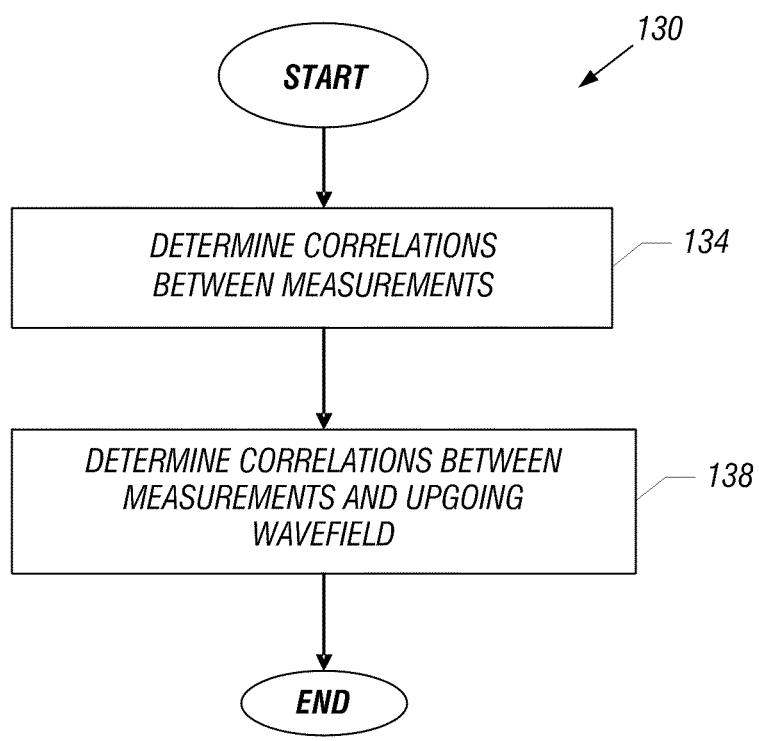
FIGS. 3 and 4 are flow diagram depicting techniques to minimize a variance of a reconstruction error according to embodiments of the invention.

Thus, to summarize, in accordance with some embodiments of the invention, a technique 130 that is depicted in FIG. 3 may be used for purposes of minimizing the variance of the reconstruction error. Referring to FIG. 3, pursuant to the technique 130, the minimization of the reconstruction error's variance involves determining (block 134) correlations between the pressure and particle motion measurements and determining (block 138) correlations between the measurements and the upgoing pressure wavefield.

In some scenarios, the wavenumber spectrum of the upgoing wavefield may not be known exactly. However, the wavenumber spectrum may be estimated from the acquired data by using, for example, spectrum estimation algorithms. Alternatively, in some scenarios, it may be assumed that the seismic data is locally a linear combination of plane waves. With this assumption, the wavenumber spectrum at a higher frequency may be related to the spectrum that has already been estimated at a lower frequency.

It is noted that because the augmented matrix on the left-hand side of Eq. 11 is a correlation matrix, the matrix is nonnegative definite. In the case that this correlation matrix is rank deficient, then the system of equations, which is set forth in Eq. 11 is overdetermined. For this case, either a minimum norm solution may be determined or alternatively, a regularized solution may be obtained by using Tikhonov regularization.

In some scenarios, there is prior information regarding the wavenumber spectrum of the upgoing wavefield. For this scenario, a conservative approximation to the wavenumber spectrum of the upgoing wavefield may be made, as described below:

$$S_u(k_x, k_y; z_s) = \begin{cases} 1, & k_z^2 + k_y^2 \le B^2 \\ 0, & \text{otherwise,} \end{cases} \quad \text{Eq. 21}$$

where "B" represents the bandwidth at the frequency f. As a non-limiting example, in accordance with some embodiments of the invention, the B bandwidth may be f/|v|, where "v" represents the velocity of the slowest event within the measurement. In the most conservative scenario, the velocity v is chosen as the acoustic speed of sound in the water, c, which corresponds to the worst case scenario in which the seismic wavefield is assumed to be a full bandwidth signal.

Eqs. 22, 23 and 24 below are examples of ways to determine some of the expectations in computing the correlation matrices in Eq. 11. The modification of these equations to compute the remaining correlations is straight forward.

$$E(p(x_m+x_{m'}, y_n+y_{n'})p^*(x_{m'}, y_{n'})) = \int |G_p(k_x, k_y; z_s)|^2 e^{j2\pi (k^x x_{m'}+k_y y_{n'})} dk_x dk_y + R_{n_p}(x_{m'}, y_{n'}), \quad \text{Eq. 22}$$

$$E(p(x_m+x_{m'}, y_n+y_{n'})v_z^*(x_{m'}, y_{n'})) = \int |G_p(k_x, k_y; z_s)G_z^*(f, k_x, k_y; z_s) e^{j2\pi(k_x x_{m'}+k_y y_{n'})} dk_x dk_y + R_{n_p}(x_{m'}, y_{n'}), \text{ and} \quad \text{Eq. 23}$$

$$E(p(x_m+x_{m'}, y_n+y_{n'})p_u^*(x_{m'}, y_{n'})) = g_p(x_{m'}, y_{n'}) \quad \text{Eq. 24}$$

In Eqs. 22, 23 and 24, the autocorrelation and cross correlation functions of the ghost operators may be digitally computed from the frequency-wavenumber (f-k) domain representations of the ghosting operators, which are set forth in Eqs. 6, 7 and 8 using the Fast Fourier Transform (FFT) algorithm. The noise levels on pressure (i.e., $\sigma_p^2$) and particle motion data (i.e., $\sigma_z^2$) may be estimated from noise-only segments of the measurement, e.g., the data before the direct arrival.

A useful feature of the ODR technique is that the expected reconstruction error (called "err") may be relatively easily determined as follows:

$$err = R_{P_u P_u}(0) - \begin{bmatrix} A \\ B \\ C \end{bmatrix}^H \begin{bmatrix} R_{pp} & R_{pz} & R_{py} \\ R_{pz}^H & R_{zz} & R_{zy} \\ R_{py}^H & R_{zy}^H & R_{yy} \end{bmatrix}^{-1} \begin{bmatrix} A \\ B \\ C \end{bmatrix}, \quad \text{Eq. 25}$$

where "$R_{P_u P_u}(0)$" represents the zero$^{th}$ lag of the autocorrelation function of the upgoing wavefield. By having an analytical expression for the expected error, an evaluation may be made as to the sufficiency of the data bandwidth assumption. For instance, searching the errors corresponding to different signal bandwidths provides an indication of what bandwidth B yields an acceptable error level. It is noted that the expected error is only a function of the bandwidth B and the streamer geometry under the flat signal spectrum assumption.

Figure 4:
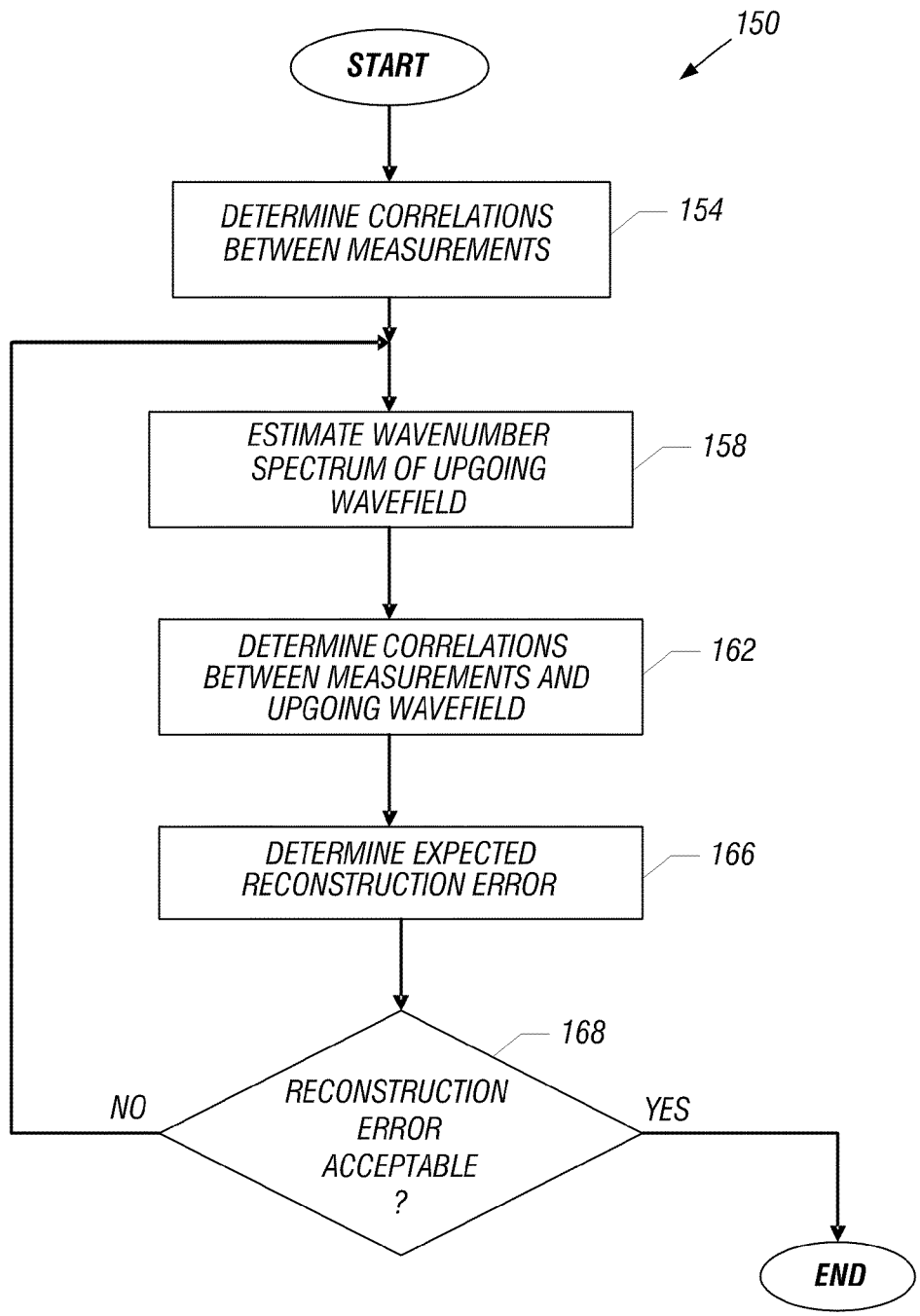

Thus, referring to FIG. 4, in accordance with embodiments of the invention, a technique 150 to estimate the data bandwidth includes determining correlations between seismic measurements, pursuant to block 154, and estimating a wavenumber spectrum of the upgoing wavefield, pursuant to block 158. Using the estimated wavenumber spectrum, the technique 150 includes determining (block 162) correlations between the measurements and the upgoing waveforms. Based on the determined correlations, the technique 150 includes determining (block 166) the expected reconstruction error. If a determination is made, pursuant to diamond 168, that the expected error is unacceptable, then the estimated wavenumber spectrum is recalculated, or adjusted, and control returns to block 158.

The ODR technique allows reconstruction and deghosting of spatially aliased seismic data. For instance, when only $p(t,x,y_m; z_s)$ and $v_z(t,x,y_m; z_s)$ are available for reconstruction and deghosting, the ODR technique dealiases the components of the data with wavenumbers from the Nyquist wavenumber to twice the Nyquist wavenumber. Similarly, when three components are available for reconstruction, e.g., $p(t,x,y_m; z_s)$, $v_y(t,x,y_m; z_s)$ and $v_z(t,x,y_m; z_s)$ are used for deghosting and reconstruction, the ODR technique dealiases the components of the data with wavenumbers from the Nyquist wavenumber to three times the Nyquist wavenumber.

Figure 5:
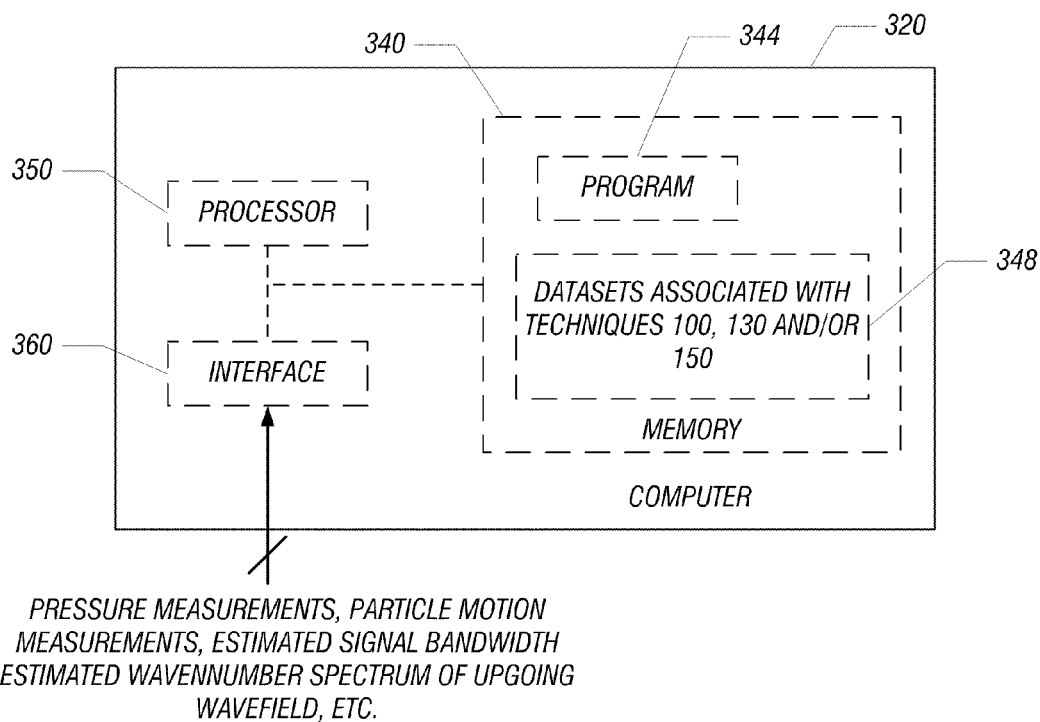
FIG. 5 is a schematic diagram of a data processing system according to an embodiment of the invention.

Referring to FIG. 5, in accordance with some embodiments of the invention, a processing system 320 may perform at least part of the techniques that are disclosed herein, such as one or more parts of the techniques 100, 130 and/or 150, for such purposes as providing a statistical estimator, which relates an upgoing seismic wavefield to a linear combination of measurements of a seismic wavefield and a reconstruction error; performing joint, or concurrent, interpolation and deghosting to determine an upgoing wavefield; minimizing a variance of a reconstruction error used in a statistical estimator; determining correlations between seismic measurements; determining correlations between seismic measurements and an upgoing wavefield; estimating a wavenumber spectrum of an upgoing seismic wavefield; estimating a wavenumber spectrum of an upgoing seismic wavefield based on the estimation of the wavefield at another frequency; estimating a wavenumber spectrum of a seismic wavefield assuming part of the wavenumber spectrum is constant; determining an expected reconstruction error and adjusting an estimation of a wavenumber spectrum of an upgoing seismic wavefield based on the determined expected reconstruction error; etc. The system 320 may be located on one of the streamers 30, on each streamer 30, distributed among the streamers 30, on the seismic source 104, on the survey vessel 30, at a remote land-based facility, etc.

In accordance with some embodiments of the invention, the system 320 may include a processor 350, such as one or more microprocessors and/or microcontrollers computing subsystems, etc. The processor 350 may be located at one station or may be distributed over several stations.

The processor 350 may be coupled to a communication interface 360 for purposes of receiving data indicative of pressure measurements, particle motion measurements, an estimated signal bandwidth; an estimated wavenumber spectrum of an upgoing wavefield; etc.

As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets involved with the techniques that are described herein. The memory 340 may store program instructions 344, which when executed by the processor 350, may cause the processor 350 to perform at least part of the techniques that are described herein, such as at least one or more of the techniques 100, 130 and/or 150, for example, and display results obtained via the technique(s) on a display (not shown in FIG. 5) of the system 320, in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving data indicative of measurements acquired by seismic sensors of a seismic wavefield, the seismic wavefield being formed from a combination of an upgoing wavefield and a downgoing wavefield;
processing the data on a processor-based machine to provide a statistical estimator relating the upgoing wavefield to a linear combination of the measurements and a reconstruction error; and
based on the statistical estimator, determining the upgoing wavefield, the determining comprising substantially minimizing a variance of the reconstruction error and interpolating the upgoing wavefield for at least one location other than one of the locations of the sensors, wherein the reconstruction error comprises an error attributable to the interpolation.

2. The method of claim 1, wherein the act of receiving comprises receiving seismic data indicative of pressure measurements and particle motion measurements.

3. The method of claim 1, wherein the act of determining the upgoing wavefield comprises performing a least squares-based minimization of the variance.

4. The method of claim 1, wherein the act of determining the upgoing wavefield comprises determining correlations between the measurements.

5. The method of claim 1, wherein the act of determining the upgoing wavefield comprises determining correlations between the measurements and the upgoing wavefield.

6. The method of claim 5, wherein the act of determining the correlations between the measurements and the wavefield comprises estimating a wavenumber spectrum of the upgoing wavefield.

7. The method of claim 6, wherein the act of estimating the wavenumber spectrum comprises estimating the wavenumber spectrum at a higher frequency based on the wavenumber spectrum at a lower frequency.

8. The method of claim 6, wherein the act of estimating the wavenumber spectrum comprises assuming part of the wavenumber spectrum is constant.

9. The method of claim 6, further comprising:
determining an expected reconstruction error; and
adjusting the estimation of the wavenumber spectrum based on the determined expected reconstruction error.

10. The method of claim 1, further comprising:
towing the seismic sensors on a spread of at least one streamer.

11. The method of claim 1, wherein the measurements are associated with a sampling that introduces spatial aliasing.

12. The method of claim 1, wherein the sensors are regularly-spaced in a grid pattern or irregularly-spaced.

13. The method of claim 1, wherein the act of receiving comprises receiving data indicative of measurements acquired by sensors of seismic streamers towed at different depths.

14. The method of claim 1, wherein the act of receiving comprises receiving data indicative of measurements acquired by particle motion and pressure sensors of seismic streamers towed at different depths.

15. A system comprising:
an interface to receive data indicative of measurements acquired by seismic sensors of a seismic wavefield, the seismic wavefield being formed from a combination of an upgoing wavefield and a downgoing wavefield; and
a processor to process the data to:
provide a statistical estimator relating the upgoing wavefield to a linear combination of the measurements and a reconstruction error; and
based on the statistical estimator, determine the upgoing wavefield, the determining comprising substantially minimizing a variance of the reconstruction error and interpolating the upgoing wavefield for at least one location other than one of the locations of the sensors, wherein the reconstruction error comprises an error attributable to the interpolation.

16. The system of claim 15, wherein the measurements comprise pressure measurements and particle motion measurements.

17. The system of claim 15, wherein the processor processes the data to perform a least squares-based minimization of the variance.

18. The system of claim 15, wherein the processor processes the data to determine correlations between the measurements.

19. The system of claim 15, wherein the processor processes the data to determine correlations between the measurements and the upgoing wavefield.

20. The system of claim 19, wherein the processor process the data to determine correlations between the measurements and the wavefield based at least in part on an estimated wavenumber spectrum of the upgoing wavefield.

21. The system of claim 20, wherein the estimated wavenumber spectrum is associated with a higher frequency and is based at least in part on a wavenumber spectrum associated with a lower frequency.

22. The system of claim 20, wherein the estimated wavenumber spectrum is nonzero and constant over a first portion of the spectrum and zero otherwise.

23. The system of claim 15, further comprising:
a spread of at least one streamer, comprising the seismic sensors.

24. The system of claim 23, further comprising:
at least one vessel to tow the spread.

25. The system of claim 15, further comprising:
a spread of streamers towed at different depths, the streamers comprising the seismic sensors.

26. The system of claim 25, wherein the seismic sensors comprise particle motion sensors and pressure sensors.

27. The system of claim 15, wherein the measurements are associated with a sampling that introduces spatial aliasing.

28. The system of claim 15, wherein the seismic sensors are regularly-spaced in a grid pattern or irregularly-spaced.

* * * * *